DATA PROCESSING CIRCUIT

Filed Aug. 22, 1961 5 Sheets-Sheet 1

0 REPRESENTS (−) 15 OR GREATER NEGATIVE VOLTAGE

1 REPRESENTS GROUND OR POSITIVE VOLTAGE

| DECIMAL DIGIT REGISTERED | FOUR LINE BINARY CODE | | | |
|---|---|---|---|---|
| | 1ST BINARY LINE | 2ND BINARY LINE | 3RD BINARY LINE | 4TH BINARY LINE |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |

INVENTOR
H. R. SHILLINGTON
BY A. C. Schwarz, Jr.
ATTORNEY

| | | CHANNELS | | | | | | | | | |
|---|---|---|---|---|---|---|---|---|---|---|---|
| | | 0 | 1 | 2 | 3 | 4 | 5 | 6 | 7 | 8 | 9 |
| SOLENOID | 1 | X | X | X | | | | X | | | |
| | 2 | X | | | X | X | | | X | | |
| | 3 | | X | | X | | X | | | X | |
| | 4 | | | X | | X | X | | | | X |

INVENTOR
H. R. SHILLINGTON
BY A. C. Schwarz, Jr.
ATTORNEY

March 29, 1966 H. R. SHILLINGTON 3,243,778

DATA PROCESSING CIRCUIT

Filed Aug. 22, 1961 5 Sheets-Sheet 3

INVENTOR
H. R. SHILLINGTON
BY A. C. Schwarz, Jr.
ATTORNEY

INVENTOR
H. R. SHILLINGTON
BY A. C. Schwarz, Jr.
ATTORNEY

INVENTOR
H.R. SHILLINGTON
BY A.C. Schwarz, Jr.
ATTORNEY

United States Patent Office 3,243,778
Patented Mar. 29, 1966

3,243,778
DATA PROCESSING CIRCUIT

Harry R. Shillington, Glen Ellyn, Ill., assignor to Western Electric Company, Incorporated, a corporation of New York Filed Aug. 22, 1961, Ser. No. 133,177
6 Claims. (Cl. 340—172.5)

This invention relates to a circuit for processing data, and more specifically to a circuit for selectively effecting the transmission of data signals from a source of data to one of two data storing circuit. An object of this invention is to provide a new, simple, and economical circuit of this character.

In the measuring and sorting of capacitors, it is often desirable to measure the capacitance value of the capacitors and thereafter sort the capacitors having in accordance with either of two consecutive numerical values in the highest decimal order of the capacitance value, during a single continuous operation. Another object of this invention is to provide an improved circuit for performing such a measuring and sorting operation.

A further object of this invention is to provide an improved circuit for differeniating between data signals representative of multidigit numbers having different numerical values in the highest decimal order and for selectively effecting the transmission of the differentiated data signals to one of two data storing circuits which are provided for storing data signals representative of multidigit numbers having different numerical values in the highest decimal order.

An additional object of this invention is to provide an improved circuit for differentiating between data signals representative of multidigit numbers having either of two consecutive numerical values in the highest deciminal order, for producing a single data signal representative of a multidigit number, and for selectively effecting the transmission of the single data signal to one of the two data storing circuits which are provided for storing data signals representative of multidigit numbers having different numerical values in the highest decimal order.

With these and other objects in mind, the present invention relates to a circuit for differentiating between different data signals and for selectively effecting the transmission of the data signals to one of two data storing circuits. A pair of data storing circuits are provided for storing different prescribed data signals and are connected to a source of data through a differentiating circuit which effects the transmission of the prescribed data signals to the selected data storing circuit.

More specifically, the present invention relates to a circuit for differentiating betwen data signals representative of multidigit numbers having either of two consecutive numerical values in the highest decimal order, wherein the multidigit number represents the capacitance value of a capacitor, and for selectively effecting the transmission of the data signals to one of two data storing circuits.

Apparatus, common in the art, is utilized to provide a digital binary code output representative of the capacitance value of a capacitor in test. The data signals of four preselected consecutive decimal orders of the binary code output are transmitted to a decoding circuit wherein the binary code decimal order preselected are transformed into straight decimal form, wherein each decimal order is represented by a single data signal (i.e. a unitary data signal). The unitary data signals of the lower three decimal orders are transmitted to a telephone crossbar switch circuit wherein a single data signal representative of the digital number represented by the three unitary data signals is produced. A cell memory circuit, which is divided into two sections, is provided in conjunction with the crossbar switch circuit to code fixtures carrying measured capacitors so that the capacitors are subsequently ejected into containers for predetermined value ranges.

The unitary data signal of the highest decimal order is transmitted to a differentiating circuit which differentiates between two preselected consecutive digits and, if the data signal corresponds to one of the two consecutive digits, the differentiating circuit causes the data signal produced in the crossbar switch circuit to be transmitted to a predetermined one of the two sections of the cell memory circuit, so that a capacitor carrying fixture is coded.

Other objects and advantages of the invention will become apparent by reference to the following detailed description and the accompanying drawings illustrating a preferred embodiment thereof, in which.

Figures 1, 6:
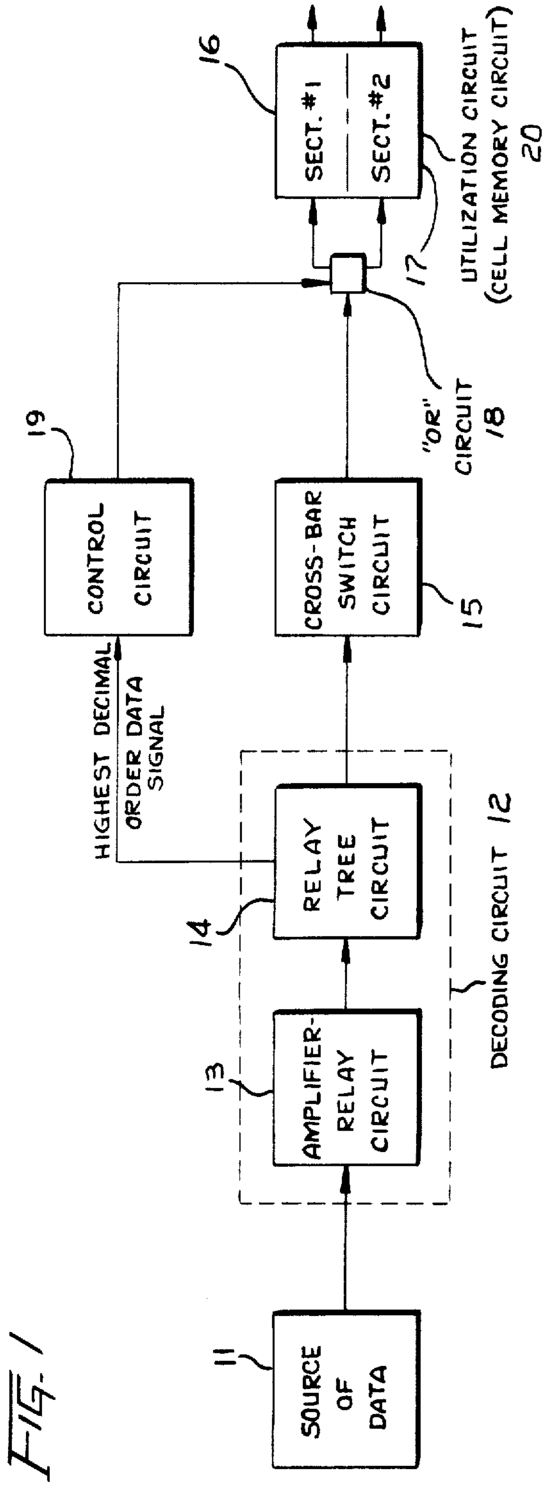
FIG. 1 is a block diagram of a general embodiment of the invention and more specifically shows the interconnection between the various circuit elements.
FIG. 6 is a table showing a key for the binary code output signals.

The invention is disclosed in the drawings as applied to an apparatus for selectively sorting capacitors into a plurality of containers in accordance with their measured capacitance values. However, this invention is not limit to this specific application but may be altered by those skilled in the art to provide numerous other arrangements.

The basic apparatus of the invention is illustrated in simplified block form in FIG. 1. A source of data 11 provides a digital binary code output representative of the capacitance value of a capacitor being measured. The source of data 11 is comprised of circuitry standard in the art, such as that disclosed in U.S. Patent No. 2,929,921, which issued March 15, 1960 to H. R. Shillington, wherein sequential pulses are transmitted to a counter for a period of time required to charge a capacitor in test to a predetermined potential. The counter is calibrated so that the number of pulses transmitted to and counted in the counter are representative of the capacitance value of the capacitor being measured.

In the preferred type of counter, a four line seven digit binary code output is provided in response to the counting of input pulses. More specifically, various combinations of four data signals are provided to represent the numerical value of each of the seven decimal orders. A table illustrating the combinations of the four data signals which represent each of the ten possible values of each decimal order is shown in FIG. 6 wherein a "0" represents a −15 volts or a greater negative voltage applied to a particular binary line and wherein a "1" represents a ground or positive potential applied to a particular binary line. Hereinafter, the counter output will be referred to as a coded digital output.

The data signals of four preselected consecutive decimal orders of the coded digital output are transmitted to a decoding circuit 12 which transforms the four decimal orders into straight decimal form wherein each digit is represented by a unitary data signal. The four consecutive decimal orders are preselected manually by an operator as the four most significant decimal orders to be produced. As illustrated in FIG. 1, the decoding circuit 12 includes an amplifier-relay circuit 13 and a relay tree circuit 14.

The highest decimal order unitary data signal provided in the decoding circuit 12 is utilized to permit or prohibit the output transmission of the second highest decimal order unitary data signal. The lower three decimal order unitary data signals are transmitted to an apparatus known in the telephone art as a crossbar switch circuit 15 wherein a single data signal is produced which is representative of the three digit number represented by the lower three decimal unitary order data signals. Actually, the single data signal produced in the crossbar switch circuit is representative of the four digit number represented by the four preselected consecutive decimal orders of the coded digital output since the output transmission of the second highest decimal order data signal is dependent on the output transmission of the highest decimal order data signal. A data signal is produced in the crossbar switch circuit only when all three of the lower three decimal order unitary data signals are transmitted thereto from the decoding circuit.

A cell memory circuit (utilization circuit) 20 which has two sections 16 and 17 is connected to the crossbar switch circuit 15 through an "OR" circuit 18 and is responsive to the data signals produced in the crossbar switch circuit for coding capacitor carrying fixtures so that measured capacitors are ejected into containers for capacitance ranges within which their values fall. The two sections 16 and 17 of the cell memory circuit 20 are provided to effect the coding of capacitor carrying fixtures of capacitors having capacitance values with either of two selected consecutive numerical values in the highest selected decimal order.

A control circuit 19 controls the operation of the "OR" circuit 18 to permit the transmission of a data signal produced in the crossbar switch circuit 15 to one of the two sections 16 and 17 of the cell memory circuit 20. The highest unitary data signal provided in the decoding circuit 12 is transmitted to the control circuit 19 which is preset to differentiate between two preselected consecutive digits in the highest decimal order. If the digit represented by the highest unitary data signal corresponds to one of the two preselected consecutive digits, the control circuit operates the "OR" circuit to permit the transmission of the single data signal produced in the crossbar switch circuit 15 to the preselected one of the two sections 16 and 17 of the cell memory circuit 20, which effects the coding of the capacitor carrying fixture.

A continuous conveyor (not shown), having capacitor carrying fixtures mounted thereon, is provided for moving capacitors to be measured and sorted to various work stations.

In accordance with this brief description of the general operation of the data processing circuit, it may be seen that the data processing circuit controls the ejection of capacitors having capacitance values with either of two consecutive numerical values in the highest decimal order of four preselected decimal orders into containers for preselected capacitance ranges.

Figures 2, 7:
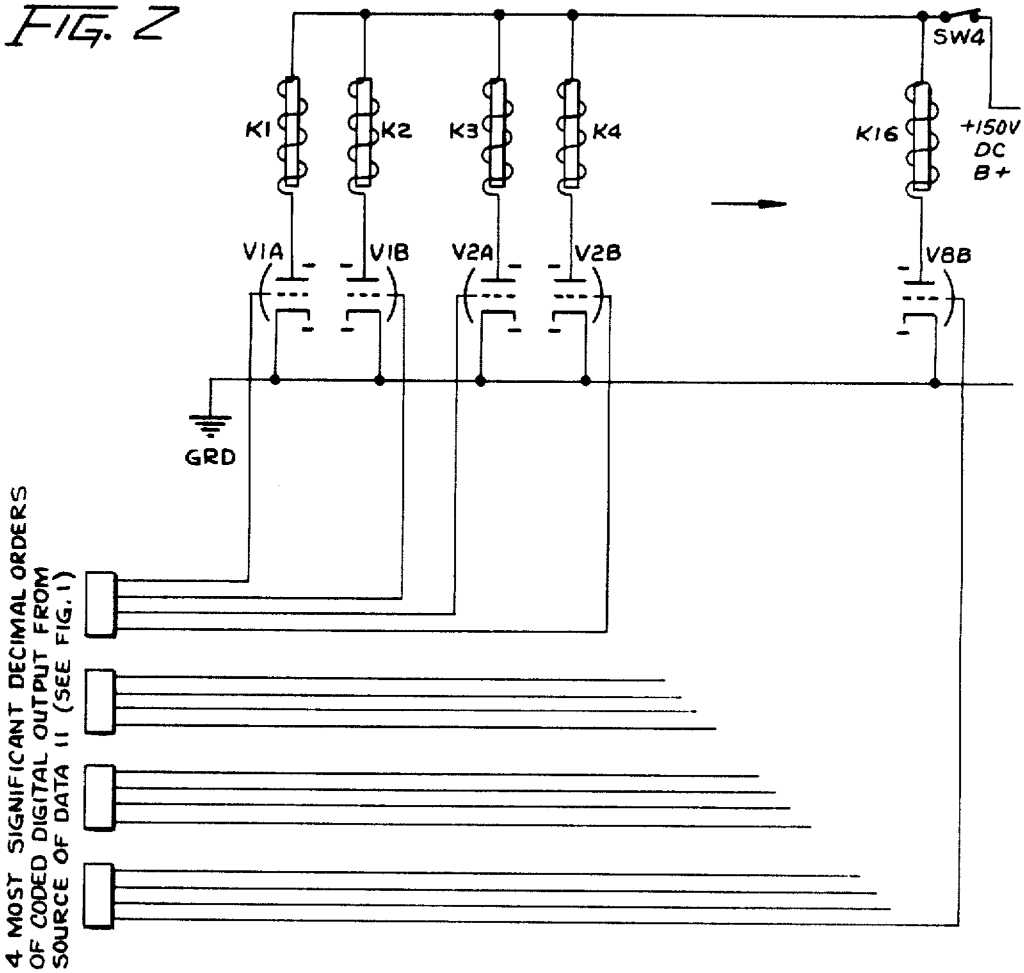
FIG. 2 is a schematic diagram of an amplifier relay circuit illustrated by block 13 in FIG. 1 showing the interconnection between decimal orders of a binary code output to be decoded, control triodes, and control relays for effecting operation of relay tree circuits illustrated in FIG. 3.
FIG. 7 is a table showing the key for the operation of cell memory circuit solenoids.

FIG. 2 illustrates a preferred embodiment of the amplifier relay circuit 13 included in the decoding circuit 12 which effects operation of the relay tree circuit 14 in response to the transmission of coded digital data signals thereto. Each output terminal of the four preselected consecutive decimal orders of the coded digital output is independently connected to a grid of one of sixteen control triodes V1A–V8B. As illustrated, the cathode of each control triode is connected to ground and the plate thereof is connected to a positive D.C. potential designated as B+ through one of sixteen control relays K1–K16 and through a normally closed manual switch SW4.

The sixteen associated control triodes and control relays are divided into four groups of four. The first group of four associated control triodes V1A–V2B and control relays K1–K4 are associated with the highest decimal order of the four preselected consecutive decimal orders of the coded digital output; the second group of four associated control triodes V3A–V4B and control relays K5–K8 are associated with the second highest decimal order of the four preselected consecutive decimal orders of the coded digtial output; the third group of four associated control triodes V5A–V6B and control relays K9–K12 are associated with the third highest decimal order of the four preselected consecutive decimal orders of the coded digital output; and the fourth group of four associated control triodes V7A–V8B and control relays K13–K16 are associated with the fourth highest decimal order of the four preselected consecutive decimal orders of the coded digital output.

When a coded digital output terminal of the preselected decimal orders has a binary code 1 data signal (positive or ground potential) applied thereto, the associated one of the control triodes V1A–V8B conducts and the associated one of the control relays K1–K16 is energized in response to the conducting of the control triode. When a coded digital output terminal of the preselected decimal orders has a binary code 0 data signal (−15 volts or greater negative potential) applied thereto, the associated one of the control tridoes V1A–V8B does not conduct and thus the associated one of the control relays K1–K16 is not energized.

Figure 3:
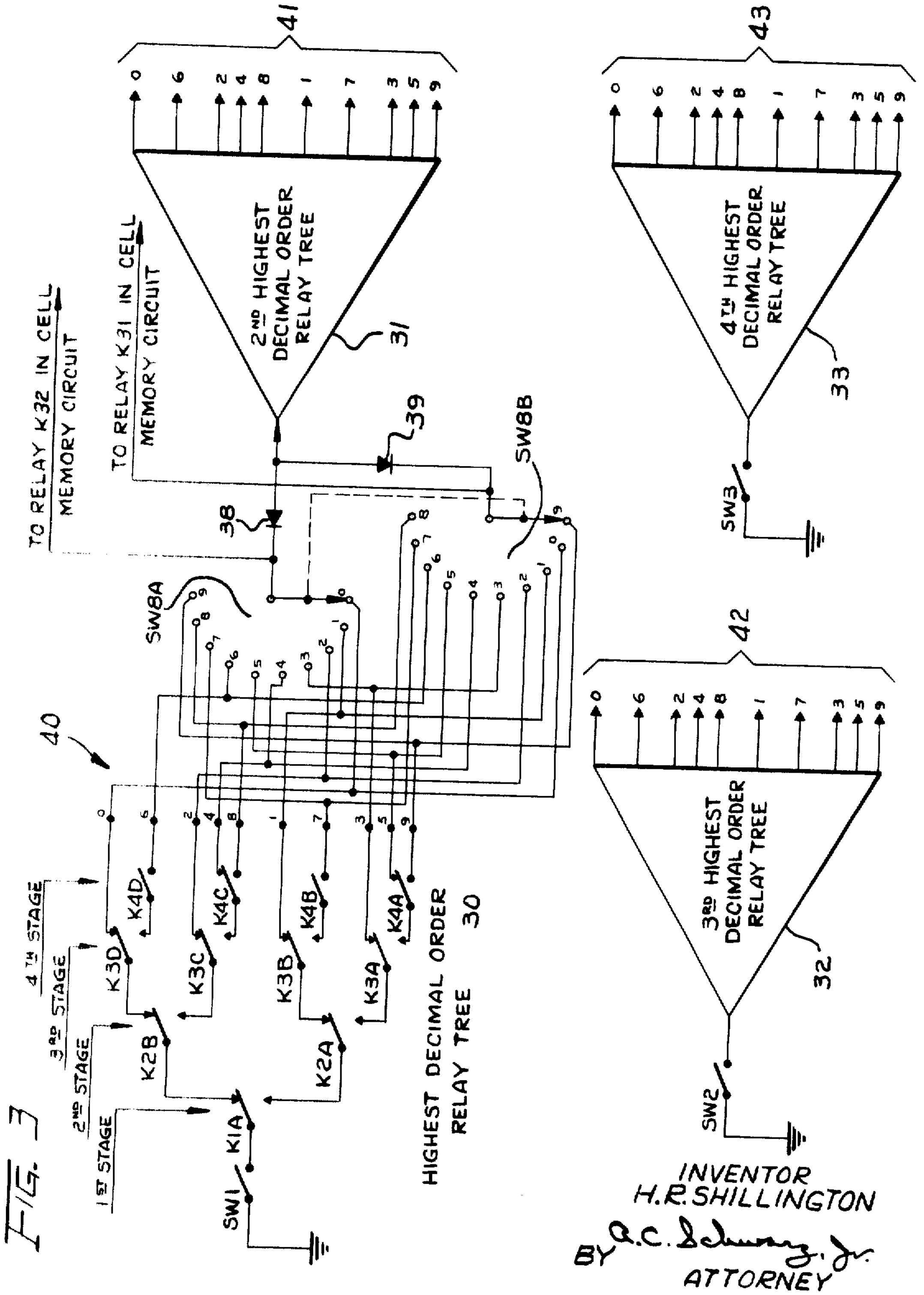
FIG. 3 is a schematic diagram of relay tree circuits illustrated by block 14 in FIG. 1 showing the interconnection of relay contacts in a tree-like arrangement for transforming a four line digital binary code output into a unitary form output.

Each of the control relays K1–K16 has contacts associated therewith which are connected in relay tree circuits (see FIG. 3). The contacts K1A–K4D of the control relays K1–K4 associated with the first group of control triodes V1A–V2B are connected in a first relay tree circuit 30 for providing a unitary data signal representative of the highest selected coded digital output digit; the contacts K5A–K8D of the control relays K5–K8 associated with the second group of control triodes V3A–V4B are connected in a second relay tree circuit 31 for providing a unitary data signal representaive of the second highest selected coded digital output digit; the contacts K9A–K12D of the control relays K9–K12 associated with the third group of control triodes V5A–V6B are connected in a third relay tree circuit 32 for providing a unitary data signal representative of the third highest selected coded digital output digit; and the contacts K13A–K16D of the control relays K13–K16 associated with the fourth group of control triodes V7A–V8B are connected in a fourth relay tree circuit 33 for providing a unitary data signal representative of the fourth highest selected coded digital output digit.

The previously referred to manual switch SW4 is included in the amplifier relay circuit 13 to remove the positive D.C. plate voltage designated B+ from the amplifier relay circuit upon being opened. In response to the removal of the D.C. plate voltage, deenergization or clearing of all the control relays is effected to condition the amplifier relay circuit 13 for accepting new data signals and to condition the relay tree circuit 14 for producing new data signals.

The relay tree circuit 14 of FIG. 1 is shown in FIG. 3 illustrating the four relay tree circuits 30–33 which are identically interconnected and which transform the four preselected consecutive digits of the coded digital output into straight decimal form (i.e. a unitary data signal)

wherein each digit is represented by a single ground data signal.

The relay trees 30, 32, and 33 associated with the first, third, and fourth highest decimal order digits preselected have ground input signals connected thereto through normally open switches SW1, SW2, and SW3 which must be closed before the relay tree circuits become effective to produce ground data signals at their outputs 40, 42, and 43.

The relay tree circuit 31 associated with the second highest decimal order digit preselected has its input connected to the output 40 of the highest decimal order digit relay tree circuit 30 through a pair of parallelly connected preset selector switches SW8A and SW8B. The data signal provided at the output 40 of the highest decimal order digit relay tree circuit 30 must correspond to the presetting of one of the selector switches SW8A and SW8B before the second highest decimal order digit relay tree circuit 31 becomes effective to produce a ground data signal at its output 41.

As described above, each of the relay tree circuits 30–33 includes the contacts of four of the control relays K1–K16, and these relay contacts are connected in a symmetrical branching arrangement having four stages. Each of the relay contacts included in the relay tree circuits has a primary (deenergized) terminal and a secondary (energized) terminal. The highest decimal order relay tree circuit 30 is illustrated in detail in FIG. 3 and the relay contacts are interconnected as described below.

The first binary stage has one relay contact K1A associated therewith which is connected to ground through the normally open switch SW1. The second binary stage has two relay contacts K2A and K2B associated therewith; contact K2B is connected in series with the primary terminal of the contact K1A and contact K2A is connected in series with the secondary terminal of the contact K1A. The third binary stage has four relay contacts K3A, K3B, K3C, and K3D associated therewith; contact K3A is connected in series with the secondary terminal of contact K2A, contact K3B is connected in series with the primary terminal of contact K2A, contact K3C is connected in series with the secondary terminal of contact K2B, and contact K3D is connected in series with the primary terminal of contact K2B. The fourth binary stage has four relay contacts K4A, K4B, K4C, and K4D associated therewith; contact K4A is connected in series with the secondary terminal of contact K3A, contact K4B is connected in series with the secondary terminal of contact K3B, contact K4C is connected in series with the secondary terminal of contact K3C, and contact K4D is connected in series with the secondary terminal of contact K3D.

Ten output terminals, each representing a decimal digit, are provided in each relay tree circuit; four of the output terminals are provided from the primary terminals of the third binary stage contacts, four of the output terminals are provided from the secondary terminals of the fourth binary stage contacts, and two of the output terminals are provided from primary terminals of two of the fourth binary stage contacts.

Figure 4:
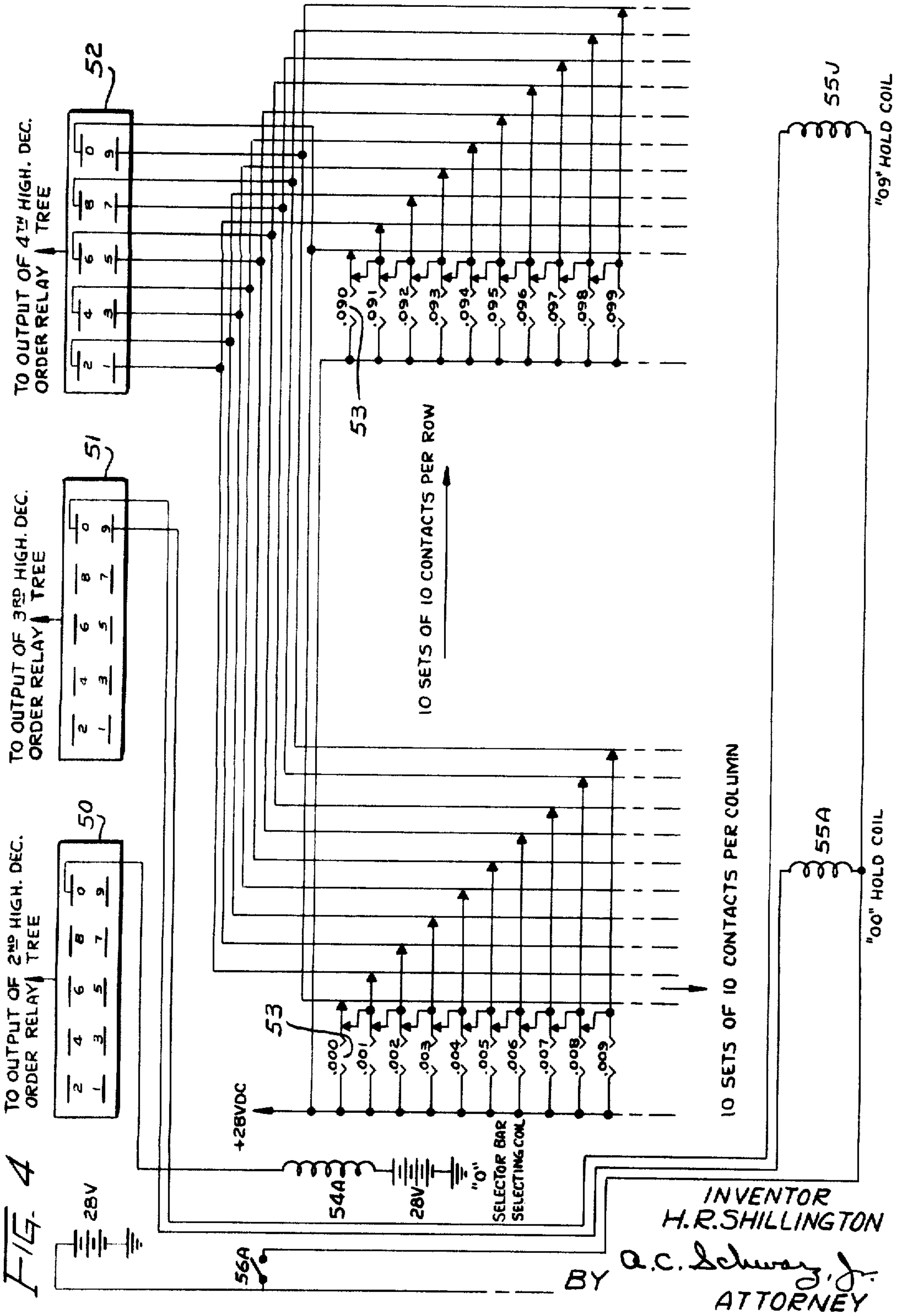
FIG. 4 is a schematic diagram of a telephone crossbar switch circuit illustrated by block 15 in FIG. 1 showing the interconnection between the outputs of three relay tree circuits so that a single data signal representative of these three outputs is produced.

As various ones of the control relays K1–K16 of the scanner circuit are energized in response to the conducting of various ones of the control triodes V1A–V8B, when the coded digital data signals of the selected digits are applied to the control triode grids and switch SW4 is closed, associated ones of the control relay contacts K1A–K16D in the relay tree circuits are moved to their secondary terminals. A data signal is provided at one of the ten output terminals of each relay tree circuit if switches SW1, SW2, and SW3 are closed and if the data signal provided at the output 40 of the highest decimal order relay tree circuit 30 corresponds to the presetting of one of the selector switches SW8A and SW8B. The data signals provided at the outputs 41, 42, and 43 of the second, third, and fourth highest decimal order relay tree circuits 31, 32, and 33 are transmitted through terminal blocks 50, 51, and 52 to the telephone crossbar switch circuit 15 (see FIG. 4). Each of the terminal blocks has ten output terminals corresponding to the ten output terminals of the associated one of the relay tree circuits.

The pair of selector switches SW8A and SW8B are connected in a gang switch arrangement whereby they are operable together as a unit. Each selector switch has ten contact terminals which are connected to the ten output terminals 40 of the highest decimal order digit relay tree circuit 30 and the selector arm of each selector switch is connected through one of two diodes 38 and 39 to the input of the second highest decimal order digit relay tree circuit 31. The selector switches are so connected in the gang arrangement that for any setting thereof, each selector arm engages a contact terminal connected to a different one of two output terminals of the highest decimal order digit relay tree circuit 30 representative of two consecutive numbers. Selector switch SW8A is associated with the higher one of the two consecutive numbers and selector switch SW8B is associated with the lower one thereof. Each diode 38 and 39 only permits passage of data signals from the associated selector switch to the second highest decimal order digit relay tree circuit 31 and thus prevents feedback of data signals from one selector switch to the other selector switch as set forth below.

The crossbar switch circuit 18 (FIG. 4), which includes 1000 jack plug sockets 53 consists of ten rows and ten columns of normally open relay contacts wherein ten sets of ten relay contacts are included in each row and each column. Each row of relay contacts includes a set of ten contacts from each column and each column includes a set of ten relay contacts from each row. A group of ten jack plug sockets is provided for each possible combination of association of a set of contacts in a row with a set of contacts in a column and the rows and columns of contacts provide 100 groups of ten jack plug sockets.

One of ten selector bar selecting coils 54A–54J is associated with each of the rows of contacts and, when one of the selector bar selecting coils is energized, the relay contacts in the associated row are closed. Each selector bar selecting coil has one end thereof connected to a positive potential and the other end thereof connected to one of the ten output terminals of the terminal block 50 so that, when a ground data signal is provided at one of the terminal block contacts by the second highest decimal order relay tree circuit 31, the associated selector bar selecting coil is energized to close the relay contacts in the associated row. Thus it may be seen that each row of relay contacts is representative of one of the ten possible digits of the second highest decimal order of the selected coded digital output digits.

One of ten hold coils 55A–55J is associated with each column of relay contacts and, when one of the hold coils is energized, the relay contacts in the associated column are closed. Each hold coil has one end thereof connected to a positive potential through a parallel arrangement of ten normally open selector bar contacts 56A–56J of the selector bar selecting coils 54A–54J and the other end thereof connected to one of the ten output terminals of the terminal block 51 so that, when one of the selector bar selecting coils is energized to close the associated one of the contacts 56A–56J and when a ground data signal is provided at one of the terminal block output terminals by the third highest decimal order relay tree circuit 32, the associated hold coil is energized to close the relay contacts in the associated column. Thus it may be seen that each column of relay contacts is representative of one of the ten possible digits of the third highest decimal order of the selected coded digital output digits and that operation of the hold coils is dependent on operation of one of the selector bar selecting coils.

Each of the ten output terminals of the terminal block 52 is connected through a selector bar selecting coil contact in each one of the rows of contacts and through a hold coil contact in each one of the columns of contacts to a jack plug socket 53 in each group of ten jack plug sockets. When one of the selector bar selecting coils and one of the hold coils have been energized, the selector bar selecting coil contacts and the hold coil contacts associated with one of the groups of ten jack plug sockets 53 are closed and the ground data signal from the fourth highest decimal order relay tree circuit 33 is transmitted through the terminal block 52 to one of the jack plug sockets 53 within this group of jack plug sockets.

Thus it may be seen that each jack plug socket 53 within a group of ten jack plug sockets is representative of one of ten possible digits of the fourth highest decimal order of the selected digital output digits and that the transmission of a ground data signal to one of the jack plug sockets is dependent on the energization of one of the selector bar selecting coils and one of the hold coils. A data signal provided at a jack plug socket is representative of a three digit number from 000 to 999 represented by the second, third, and fourth highest decimal orders of the selected coded digital output digits. Actually, a data signal provided at a jack plug socket is representative of a four digit number from 0000 to 9999 since the output transmission of the second highest decimal order relay tree circuit is dependent on the output transmission of the highest decimal order relay tree circuit. Single data signals produced in the crossbar switch circuit are transmitted to the cell memory circuit.

Figure 5:
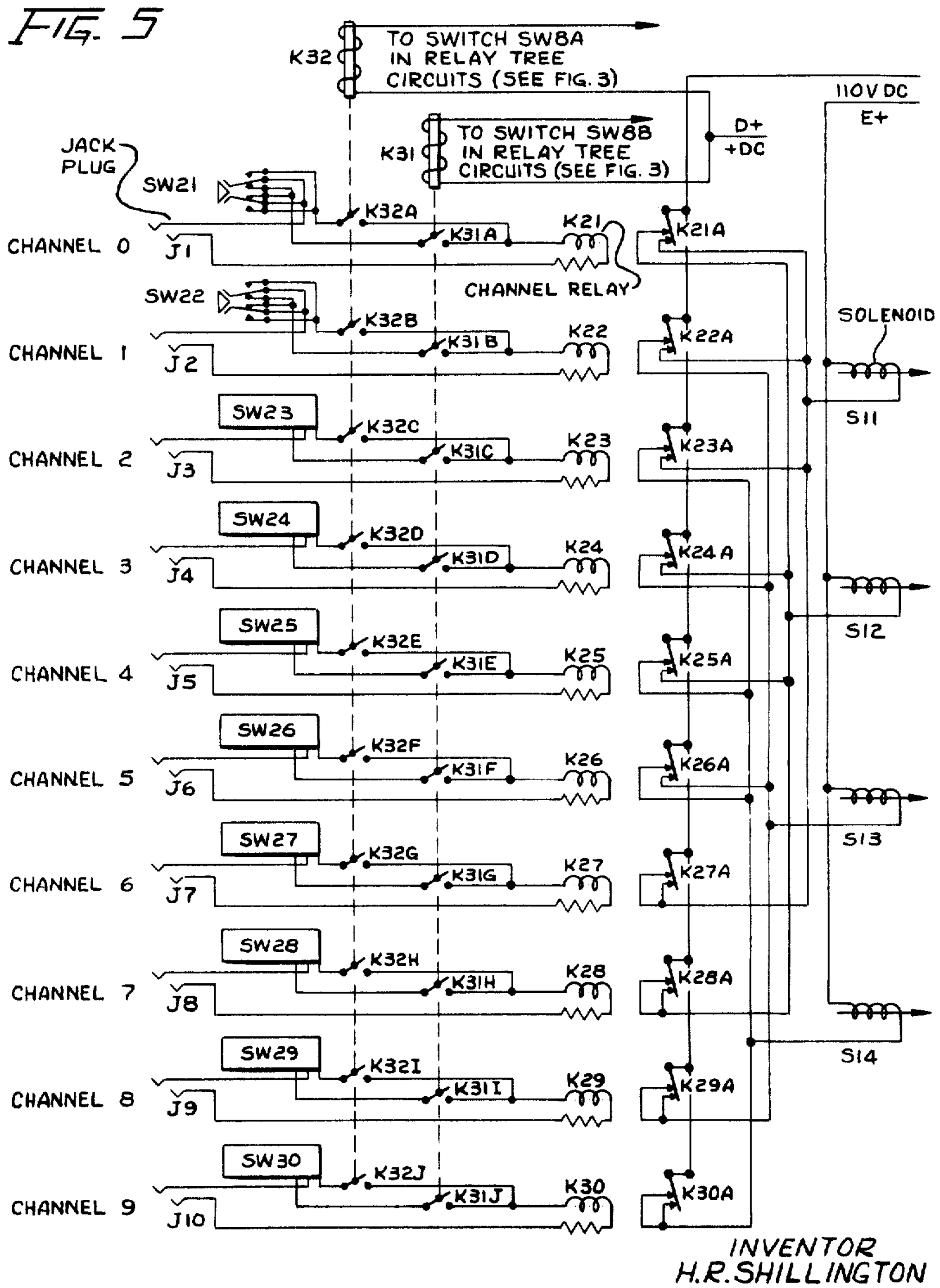
FIG. 5 is a schematic diagram of a cell memory circuit illustrated by block 20 in FIG. 1 showing a circuit utilized to control the coding of a capacitor carrying fixture in response to the transmission of a data signal from a crossbar switch circuit so that a capacitor carried in the capacitor carrying fixture is ejected into a predetermined container.

The cell memory or sorting circuit 20 is illustrated in FIG. 5 and controls the coding of a capacitor carrying fixture so that a measured capacitor is ejected into a container for a capacitance range within which its measured value of capacitance falls. The cell memory circuit includes ten jack plugs J1–J10 and each jack plug is inserted into one of the jack plug sockets in the crossbar switch circuit 15. One of ten channel relays K21–K30 is independently connected in series with each of the jack plugs through one of ten programmable push button switches SW21–SW30 and, either, one of ten normally open relay contacts K31A–K31J of a relay K31 associated with selector switch SW8B or one of ten normally open relay contacts K32A–K32J of a relay K32 associated with selector switch SW8A.

When the push button switches SW21–SW30 are in their primary (nondepressed) positions, the jacks J1–J10 and the channel relays K21–K30 are connected together through the primary contacts of the switches SW21–SW30 and through the normally open contacts K31A–K31J of relay K31 and when the push button switches are depressed into their secondary positions, the jacks J1–J10 and the channel relays K21–K30 are connected through the secondary contacts of the switches SW21–SW30 and through normally open contacts K32A–K32J of relay K32.

By depressing various ones of the push button switches SW21–SW30, various ones of the jack plugs and channel relays may be associated with the relay K32 and by not depressing various other ones of the push button switches, various other ones of the jack plugs and channel relays may be associated with the relay K31. Thus it may be seen that the push button switches are utilized to divide the cell memory circuit 20 into the two sections 16 and 17 which are associated with the two selector switches SW8A and SW8B.

Relay K31 is connected to the selector arm of the selector switch SW8B so that, if the ground data signal provided at the output 40 of the highest decimal order digit relay tree circuit 30 corresponds to the presetting of the selector switch SW8B, relay K31 is energized since it is connected between ground and a positive potential designated D+, and relay K32 is connected to the selector arm of the selector switch SW8A so that, if the ground data signal provided at the output 40 of the highest decimal order digit relay tree circuit 30 corresponds to the presetting of the selector switch SW8A, relay K32 is energized since it is connected between ground and the positive potential designated as D+. The diodes 38 and 39 prevent the transmission (feedback) of a data signal from the selector arm of one of the selector switches to the selector arm of the other selector switch so that, when the ground data signal provided at the output of the highest decimal order digit relay tree circuit corresponds to the presetting of one of the selector switches, the relay K31 or K32 associated with the other selector switch is not energized. It is thus seen that the selector switches SW8A and SW8B together with their associated relays K31 and K32, respectively, provide a means for differentiating between either one of two preselected ground signals appearing at the output of the highest decimal order digit relay tree.

When inserted in the jack plug sockets, the jack plugs J1–J10 divide the crossbar switch circuit into ten output ranges and, when a ground data signal is provided at a jack plug socket into which a jack plug is inserted, the associated one of the channel relays K21–K30 is energized, if the push button switch (SW21–SW30) associated with the channel relay is conditioned to associate the channel relay with the energized one of the relays K31 and K32. The crossbar switch circuit is so constructed that if a ground data signal is presented at a jack plug socket between two jack plug sockets into which jack plugs are inserted, the ground data signal is applied to the jack plug inserted in the jack plug socket for receiving a data signal representative of the higher three digit numbers and the associated one of the channel relays is energized.

Since, as described above, various ones of the jack plugs and channel relays may be associated with each of the selector switches by depressing or not depressing various ones of the push button switches SW21–SW30, in accordance with a predetermined program various ones of the output ranges may be associated with each of the selector switches SW8A and SW8B, and for each capacitor tested only the channel relays associated with the selector switch which corresponds to the data signal provided at the output of the highest decimal order relay tree circuit may be energized. Thus, when a ground data signal is applied to a jack plug not associated with the corresponding selector switch, the channel relay associated with the jack plug is not effected.

The crossbar switch circuit 15 is a standard circuit used in the telephone art and therefore, the construction features thereof will not be described in further detail.

Each of the channel relays K21–K30 has a normally open channel relay contact K21A–K30A which is closed when the associated channel relay is energized. Closing of one of the channel relay contacts causes one or more of four memory circuit solenoids S11–S14 to have a 110 volt A.C. input designated as E+ applied thereto and thus causes one or more of the memory circuit solenoids to be energized. The energized memory circuit solenoids effect the coding of the fixture carrying the capacitor in test by depressing various pins projecting therefrom. Subsequently, when the conveyor moves the capacitor carrying fixture past various capacitor ejection stations, the nondepressed projecting pins correspond to and cooperate with pins adjacent one of the ejection stations to cause the capacitor to be ejected into a container for the particular capacitance range within which the value represented by the single data signal from the crossbar switch circuit falls. Any satisfactory mechanism may be utilized to cooperate with the projecting pins in causing the capacitors to be ejected into the prescribed containers.

The four memory circuit solenoids are utilized for controlling the ejection of a capacitor into any one of ten containers through various combinations of operation as illustrated in the key table of FIG. 7. Each of the containers is associated with one of the jack plugs J1–J10 and the value range for each container is determined by inserting the jack plugs into preselected ones of the jack plug sockets 53 in the crossbar switch circuit and by depressing or not depressing various ones of the push button switches SW21–SW30. If the test results of a capacitor in test do not cause actuation of any of the memory circuit solenoids, the capacitor is automatically ejected into an eleventh container for rejects.

Each container is preselectively associated with one of the selector switches SW8A and SW8B by depressing or not depressing various ones of the push button switches SW21–SW30, and thus each container is preselected to receive capacitors having one of two consecutive numbers in the highest preselected decimal order and having a value which falls within a preselected value range.

The above-described circuit may now be seen to be utilizable for measuring and sorting capacitors having values wherein the number represented by the four most significant decimal orders falls within any preselected range of 1000 numbers, having either of two consecutive numbers in the highest decimal order, whereas previously utilized circuits only permit the measuring and sorting of capacitors having values wherein the highest decimal order digit of the four most significant decimal orders is a single preselected number. For example, the above-described circuit may be utilized for measuring and sorting capacitors having values wherein the four most significant decimal orders fall within the ranges of 1500 to 2499 or 4100 to 5099 and the previously utilized circuits are utilizable for measuring and sorting capacitors having values wherein the four most significant decimal orders fall within the range of 1000 to 1999 or 4000 to 4999 Thus it may be seen that the above-described circuit allows for more flexibility in the measuring and sorting of capacitors.

The subject circuit may also be modified to be utilizable for measuring and sorting capacitors having values wherein the numbers represented by the four most significant decimal orders fall within a preselected range of 2000 numbers, having either of two consecutive numbers in the highest decimal order. The above-described circuit could be modified to accomplish this result by utilizing two sets of memory circuit solenoids for coding capacitor carrying fixtures. The jack plugs J1–J10 would be connected directly to the channel relays K21–K30 without passing through the push button switches SW21–SW30 and the relay contacts K32A–K32J or K31A–K31J. Each of the two sets of memory circuit solenoids would be independently connected to the channel relay contacts in a programmed manner through contacts of one of the two relays K31 and K32. With this arrangement, if the ground data signal provided at the output 40 of the highest decimal order digit relay tree circuit 30 corresponds to the presetting of one of the two selector switches SW8A and SW8B, one of the two relays K31 and K32 will be energized and one of the sets of memory circuit solenoids will be selected to code the capacitor carrying fixture. Thus, with this arrangement, the capacitors having value ranges, for example, of 2000 to 3999 or 4500 to 5999 may be measured and sorted with one setting of the selector switches. The range of values covered by each of the ten channels in either the sorting circuit depicted in FIG. 5 or in the alternative embodiment can, of course, be programmed either by selective connection of the jack plugs to desired crosspoints in the crossbar switch, or by the manner in which the sorting solenoids are interconnected to the switching contacts of the channel relays, or both.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. A circuit for processing a binary encoded data signal transmitted from a source of data signals wherein each data signal is representative of a multidigit number, which comprises:

transformation means, responsive to the transmission thereto from the source of data of a binary encoded data signal representative of a multidigit number having one of two preselected numerical values in the highest decimal order, for transforming said data signal into a single, decoded data signal representative of the multidigit number;

a subdividable memory circuit for selectively storing therein, for subsequent utilization, a single decoded data signal transmitted thereto from said transformation means; and selective means connected to said transformation means, and responsive only to a binary encoded data signal applied to said last-mentioned means which is representative of a multidigit number having one of the two preselected numerical values in the highest decimal order thereof, for effecting the transmission of the single decoded data signal produced in the transformation means to said subdividable memory circuit for selective storage therein, the selection of the particular portion of the memory circuit into which the single decoded data signal is stored being controlled, at least in part, by said selector means which is capable of differentiating between which one of the two preselected numerical values appeared in the highest decimal order of the encoded data signal applied to said transformation means, the selective means being regulatable so as to respond to an encoded data signal representative of a multidigit number having various combinations of two preselected numerical values in the highest decimal order thereof.

2. A data processing circuit for decoding an encoded data signal composed of a plurality of independent sets of binary bit data signals representative of a multidigit number having a different one of two preselected consecutive numerical values in the highest decimal order thereof, each of which sets represents the numerical value of a differential decimal order of the multidigit number, which circuit comprises:

a plurality of decoding circuits equal in number to the number of individual sets of data signals defining a multidigit number to be decoded for producing, in response to a different set of data signals representative of a different decimal order applied to an input of each decoding circuit, a plurality of unitary data signals which respectively represent the numerical values initially defined by the associated sets of data signals;

circuit means, connectable with all of said decoding circuits except said decoding circuit which decodes the set of data signals representative of the numerical value of the highest decimal order of the multidigit number, for producing, in response to a unitary data signal produced by each of said decoding circuits except said highest order decoding circuit, a single data signal representative of the total numerical value of the associated unitary data signals;

a programmable, subdividable sorting circuit, said sorting circuit being connectable to said circuit means for selectively storing therein, for subsequent utilization, the single data signal produced by said circuit means; and control circuit means at least a portion of which is responsive to a unitary data signal applied thereto from said highest order decoding circuit only when said last-mentioned unitary data signal is representative of one of said two preselected numerical values (1) for permitting all of said decoding circuits other than said highest order decoding circuit to produce unitary data signals, whereby a single data signal representative of the associated lower order unitary data signals is produced by said circuit means, and (2) for effecting the transmission of said single data signal from said circuit means to said data sorting circuit for storage in selected portions thereof, the particular portion being controlled, at least in part, by said control circuit means which is capable of differentiating between which one of the two preselected numerical values appeared in the highest decimal order of the multidigit number represented by the encoded data signal being processed.

3. A circuit for controlling the sorting of articles in accordance with the magnitude of a binary encoded data signal representative of the numerical value of a measurable characteristic of the article, the binary encoded data signals being representative of a multidigit number, which comprises:

a decoding circuit for providing a plurality of unitary data signals respectively representative of different decimal orders of the multidigit number represented by the binary encoded data signal applied thereto only when said multidigit number has one of two preselected numerical values in the highest decimal order;

circuit means responsive to all of the unitary data signals produced by said decoding circuit other than the unitary data signal representative of the highest decimal order of the multidigit number for producing a single decoded data signal representative of the total numerical value of the associated lower order unitary signals;

a programmable, selectively subidividable sorting circuit, said sorting circuit controlling the sorting of articles into discrete categories dependent on the programmed portions into which the single decoded data signal is directed therein from said circuit means; and control means connected to said decoding circuit and responsive to a unitary data signal representative of either of the two preselected numerical values in the highest decimal order of the multidigit number (1) for permitting said decoding circuit to produce all of the unitary data signals other than the one representative of the highest decimal order and thereby, for effecting their transmission to the circuit means and (2) for effecting the transmission of the single decoded data signal from said circuit means to said sorting circuit for storage in selected portions therein, the particular portion of the sorting circuit into which each single decoded data signal is directed being controlled, at least in part, by said control means which is capable of differentiating between which one of the two preselected numerical values appeared in the highest decimal order of the encoded data signal being processed, the control means being regulatable so that the two preselected numerical values may be varied.

4. A circuit for controlling the sorting of articles in accordance with the magnitude of an encoded data signal composed of a plurality of independent sets of binary bit data signals, each of which sets represents the numerical value of a different decimal order of a multidigit number corresponding in value to a measurable characteristic of the article, which circuit comprises:

a plurality of decoding circuits equal in number to the number of individual sets of data signals defining a multidigit number to be decoded for producing, in response to a different set of data signals representative of a different decimal order applied to an input of each decoding circuit, a plurality of unitary data signals which respectively represent the numerical values initially defined by the associated sets of data signals;

circuit means, connectable with all of said decoding circuits except said decoding circuit which decodes the set of data signals representative of the numerical value of the highest decimal order of the multidigit number, for producing, in response to a unitary data signal produced by each of said decoding circuits except said highest order decoding circuit, a single data signal representative of the total numerical value of the associated unitary data signals;

a programmable, subdividable sorting circuit, said sorting circuit being connectable to said circuit means for selectively storing therein the single data signal produced by said circuit means for subsequent utilization in effecting the sorting of articles; and control circuit means at least a portion of which is responsive to a unitary data signal applied thereto from said highest order decoding circuit only when said last-mentioned unitary data signal is representative of one of said two preselected numerical values (1) for permitting all of said decoding circuits other than said highest order decoding circuit to produce unitary data signals, whereby a single data signal representative of the associated lower order unitary data signals is produced by said circuit means, and (2) for effecting the transmission of said single data signal from said circuit means to said data sorting circuit for storage in selected portions thereof, the particular portion being controlled, at least in part, by said control circuit which is capable of differentiating between which one of the two preselected numerical values appeared in the highest decimal order of the multidigit number represented by the encoded data signal being processed, with the actual storage of said single data signal in a selected portion of said sorting circuit being dependent, at least in part, on said signal representing a numerical value encompassed by a predetermined programmed range of values assigned to the selected portion of said sorting circuit, said programmed range of values being defined within the limits of the preselected and associated one of said consecutive highest order numerical values.

5. The circuit for controlling the sorting of articles as recited in claim 4 wherein there are four of said decoding circuits, each of which circuits develops a unitary data signal by applying a signal to a particular one of ten output circuits of each of said decoding circuits in correspondence with the numerical value of the set of data signals decoded thereby; wherein said control means includes a pair of parallel connected, gang operable, preset selector switches for connecting only two of the output circuits of said highest order decoding circuit to an input of said second highest order decoding circuit so that a unitary data signal must be produced at one of the two output circuits of said highest order decoding circuit connected to said input of said second highest order decoding circuit in order for said second decoding circuit to produce a unitary data signal in correspondence with the set of data signals decoded thereby, each of said selector switches having ten output contact terminals connected to the ten output circuits of said highest order decoding circuit and having a selector arm connected to said input of said second decoding circuit, the selector switches being connected in a gang arrangement so that for any setting thereof each selector switch selector arm engages a contact terminal connected to a different one of two output circuits of said highest order decoding circuits representative of a different one of two consecutive numerical values; and wherein said control means further includes a pair of control relays, each of said control relays being associated with preselected portions of said subdividable sorting circuit and connected to the selector arm of a different one of said selector switches, a particular one of said relays being energized only when the output of said highest order decoding circuit corresponds to the setting of said selector switch associated with said relay, preselected portions of said sorting circuit being connected to said circuit means through its associated relay so that a single data signal can be transmitted thereto only when its associated control relay is energized to close the associated normally open relay contact.

6. The circuit for controlling the sorting of articles as recited in claim 5 further comprising means for preventing feedback through said selector switches so that a unitary data signal transmitted from said highest order decoding circuit through one of said selector switches has no effect on the control relay associated with the other of said switches.

References Cited by the Examiner

UNITED STATES PATENTS

| | | | |
|---|---|---|---|
| 2,982,818 | 5/1961 | Kendall | 340—172.54 X |
| 3,052,350 | 9/1962 | Marcowitz et al. | 209—74 |
| 3,108,694 | 10/1963 | Crain et al. | 340—172.5 |

ROBERT C. BAILEY, *Primary Examiner.*

MALCOLM A. MORRISON, *Examiner.*

P. J. HENON, W. M. BECKER, *Assistant Examiners.*